United States Patent
Biswas et al.

(10) Patent No.: US 10,445,513 B2
(45) Date of Patent: Oct. 15, 2019

(54) PRIVACY MANAGEMENT

(71) Applicant: Nokia Technologies Oy, Espoo (FI)

(72) Inventors: Debmalya Biswas, Lausanne (CH);
Julian Nolan, Lausanne (CH);
Matthew John Lawrenson, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 106 days.

(21) Appl. No.: 15/553,897

(22) PCT Filed: Mar. 6, 2015

(86) PCT No.: PCT/FI2015/050146
§ 371 (c)(1),
(2) Date: Aug. 25, 2017

(87) PCT Pub. No.: WO2016/142571
PCT Pub. Date: Sep. 15, 2016

(65) Prior Publication Data
US 2018/0068126 A1 Mar. 8, 2018

(51) Int. Cl.
*G06F 21/62* (2013.01)
*G06F 21/60* (2013.01)
*G06F 8/33* (2018.01)
*G06F 8/77* (2018.01)

(52) U.S. Cl.
CPC ............... *G06F 21/62* (2013.01); *G06F 8/33* (2013.01); *G06F 8/77* (2013.01); *G06F 21/602* (2013.01); *G06F 21/6245* (2013.01)

(58) Field of Classification Search
CPC ........................................................ G06F 21/62
See application file for complete search history.

(56) References Cited

U.S. PATENT DOCUMENTS

| 8,595,685 B2 | 11/2013 | Sharma et al. |
| 8,832,854 B1 | 9/2014 | Staddon et al. |
| 2005/0223354 A1 | 10/2005 | Drissi et al. |

(Continued)

FOREIGN PATENT DOCUMENTS

WO 2014/088574 A2 6/2014

OTHER PUBLICATIONS

Extended European Search Report received for corresponding European Patent Application No. 15884448.0, dated Oct. 22, 2018, 8 pages.

(Continued)

*Primary Examiner* — Ali Shayanfar
(74) *Attorney, Agent, or Firm* — Seppo Laine Oy

(57) ABSTRACT

According to an example aspect of the present invention, there is provided an apparatus comprising a memory interface configured to access a plurality of privacy feature requirement sets, each privacy feature requirement set being associated with a source code segment, and at least one processing core configured to select a first source code segment from among the source code segments based on a comparison between a privacy feature requirement set associated with the first source code segment and a current privacy feature requirement set, and to derive a privacy feature deviation set using the current privacy feature requirement set and the selected first source code segment.

16 Claims, 4 Drawing Sheets

(56) References Cited

U.S. PATENT DOCUMENTS

| | | | |
|---|---|---|---|
| 2011/0154446 A1* | 6/2011 | Drozt | H04L 51/38 726/4 |
| 2012/0110174 A1 | 5/2012 | Wooton et al. | |
| 2012/0135775 A1* | 5/2012 | Drozt | H04L 63/0407 455/518 |
| 2012/0222083 A1 | 8/2012 | Vaha-Sipila et al. | |
| 2013/0198849 A1 | 8/2013 | Aad et al. | |
| 2013/0276136 A1* | 10/2013 | Goodwin | H04L 67/22 726/27 |
| 2013/0278427 A1* | 10/2013 | Setton | G08B 21/12 340/584 |
| 2013/0298138 A1 | 11/2013 | Avadhanam | |
| 2013/0305379 A1* | 11/2013 | Udani | G06F 21/51 726/26 |
| 2014/0137264 A1* | 5/2014 | Bilogrevic | G06F 21/54 726/27 |
| 2014/0237620 A1* | 8/2014 | Ukil | G06F 21/60 726/26 |
| 2015/0012965 A1* | 1/2015 | Furukawa | G06Q 50/10 726/1 |
| 2015/0067883 A1* | 3/2015 | Shen | G06Q 50/01 726/27 |
| 2015/0077323 A1* | 3/2015 | Ramaswamy | G06F 3/012 345/156 |
| 2015/0242648 A1* | 8/2015 | Lemmey | G06F 21/62 726/30 |
| 2017/0068810 A1* | 3/2017 | Yao | G06F 21/57 |

OTHER PUBLICATIONS

"Germany Fines Google Over Data Collection", The New York Times, Retrieved on Aug. 22, 2017, Webpage available at: http://www.nytimes.com/2013/04/23/technology/germany-fines-google-over-data-collection.html.

"K-anonymity", Wikipedia, Retrieved on Aug. 22, 2017, Webpage available at: https://en.wikipedia.org/wiki/K-anonymity.

International Search Report and Written Opinion received for corresponding Patent Cooperation Treaty Application No. PCT/FI2015/050146, dated Jul. 2, 2015, 16 pages.

Fortino et al., "Enabling Effective Programming and FlexibleManagement of Efficient Body Sensor Network Applications", IEEE Transactions on Human-Machine Systems, vol. 43, No. 1, Jan. 2013, pp. 115-133.

* cited by examiner

PRIVACY MANAGEMENT

RELATED APPLICATION

This application was originally filed as PCT Application No. PCT/FI2015/050146 filed Mar. 6, 2015.

FIELD OF INVENTION

The invention relates to the field of data secrecy and/or privacy management.

BACKGROUND OF INVENTION

Requirements for handling data depend on characteristics of the data. For example, data that is public and of high importance may be archived in a way that places it at the disposal of the public, and simultaneously ensures its permanence for indefinite retention. For example, microfilm and acid-free paper are technologies that are capable of retaining information for several centuries, while allowing repeated access to the information. Examples of public high-importance data include correspondence of heads of state and archives of major newspapers.

Data that is public but only of transient relevance may be stored in a way that ensures access by the public, but need not ensure permanent retention. For example, information on traffic conditions on roads may be relevant while the conditions last, but irrelevant afterwards. Such data may be stored on a world wide web, WWW, page, for example, where it may be accessed by users and later on replaced with more up-to-date data, which may be automatically generated, for example.

On the other hand, private or secret data needs to be stored in a way that restricts access. Restrictions in access may take the form of physical restrictions or procedural restrictions. Physical restrictions include storing the private or secret data in sites which are not open to the public, such as, for example, in an underground bank datacentre. Procedural restrictions include use of encryption, wherein a user may encrypt his data before storing it in a cloud service, for example.

In handling private or secret data using computer programs, programming errors may inadvertently compromise the intended level of privacy or secrecy. To ensure computer programs intended to handle such data types operate in a correct way, the programs may be tested extensively, and their source codes and/or requirement specifications may be reviewed. Such reviews may be performed by peers in an organization that develops computer programs. Alternatively or additionally, such reviews may be performed by members of the general public where the computer programs are open-source.

It has been known to occur that despite testing, programming errors may persist in computer programs that are released into use. Patching up such errors may involve a continuous effort and patches need to be released as soon as possible after a privacy-compromising error has been discovered to prevent malicious parties from using the error. An example of a privacy-compromising programming error was the "Heartbleed bug" discovered in the OpenSSL cryptography library in 2014.

SUMMARY OF THE INVENTION

The invention is defined by the features of the independent claims. Some specific embodiments are defined in the dependent claims.

According to a first aspect of the present invention, there is provided an apparatus comprising a memory interface configured to access a plurality of privacy feature requirement sets, each privacy feature requirement set being associated with a source code segment, and at least one processing core configured to select a first source code segment from among the source code segments based on a comparison between a privacy feature requirement set associated with the first source code segment and a current privacy feature requirement set, and to derive a privacy feature deviation set using the current privacy feature requirement set and the selected first source code segment.

Various embodiments of the first aspect may comprise at least one feature comprised in the following bulleted list:

- the at least one processing core is further configured to flag any privacy feature deviation comprised in the privacy feature deviation set that exceeds a threshold level of deviation
- the at least one processing core is configured to derive the privacy feature deviation set by determining a difference between the current privacy feature requirement set and a privacy feature usage set of the first source code segment
- the memory interface is configured to access the privacy feature usage set of the first source code segment from a memory
- the at least one processing core is configured to determine, for each of the of source code segments, a corresponding privacy feature usage set
- the at least one processing core is configured to select the first source code segment by minimizing a sum of differences of corresponding privacy feature requirement components comprised in the privacy feature requirement sets
- the at least one processing core is configured to associate privacy feature requirement components comprised in the privacy feature requirement component sets corresponding to the source code segments comprised in the source code segments with semantically close privacy feature requirement components before minimizing the sum of differences
- the at least one processing core is configured to select more than one source code segment based on the comparison
- each privacy feature requirement set comprises at least one requirement relating to at least one privacy feature
- the at least one privacy feature comprises at least one of the following: a list of accessed sensors, a frequency of sensor access, an encryption strength parameter, a data retention period, a data anonymization parameter and a parameter reflective of data sharing
- the at least one processing core is configured to predict that a program similar to the first source code segment will be developed based on the current privacy feature requirement set.

According to a second aspect of the present invention, there is provided a method comprising accessing a plurality of privacy feature requirement sets, each privacy feature requirement set being associated with a source code segment, selecting a first source code segment from among the source code segments based on a comparison between a privacy feature requirement set associated with the first source code segment and a current privacy feature requirement set, and deriving a privacy feature deviation set using the current privacy feature requirement set and the selected first source code segment.

Various embodiments of the second aspect may comprise at least one feature comprised in the preceding bulleted list laid out in connection with the first aspect.

According to a third aspect of the present invention, there is provided an apparatus comprising means for accessing a plurality of privacy feature requirement sets, each privacy feature requirement set being associated with a source code segments, means for selecting a first source code segment from among the source code segments based on a comparison between a privacy feature requirement set associated with the first source code segment and a current privacy feature requirement set, and means for deriving a privacy feature deviation set using the current privacy feature requirement set and the selected first source code segment.

According to a fourth aspect of the present invention, there is provided a non-transitory computer readable medium having stored thereon a set of computer readable instructions that, when executed by at least one processor, cause an apparatus to at least access a plurality of privacy feature requirement sets, each privacy feature requirement set being associated with a source code segments, select a first source code segment from among the source code segments based on a comparison between a privacy feature requirement set associated with the first source code segment and a current privacy feature requirement set, and derive a privacy feature deviation set using the current privacy feature requirement set and the selected first source code segment.

According to a fifth aspect of the present invention, there is provided an apparatus comprising at least one processing core and at least one memory including computer program code, the at least one memory and the computer program code being configured to, with the at least one processing core, cause the apparatus at least to access a plurality of privacy feature requirement sets, each privacy feature requirement set being associated with a source code segments, select a first source code segment from among the source code segments based on a comparison between a privacy feature requirement set associated with the first source code segment and a current privacy feature requirement set, and derive a privacy feature deviation set using the current privacy feature requirement set and the selected first source code segment.

According to a sixth aspect of the present invention, there is provided a computer program configured to cause a method in accordance with the second aspect to be performed.

INDUSTRIAL APPLICABILITY

At least some embodiments of the present invention find industrial application in securing data against accidental disclosure.

DETAILED DESCRIPTION OF EXAMPLE EMBODIMENTS

By using a library of existing programs, privacy-related flaws in programs under development may be controlled. In detail, an already completed existing program that most closely matches the program under development is identified, and used to predict whether privacy-related flaws would likely be made in the program under development.

Figure 1:
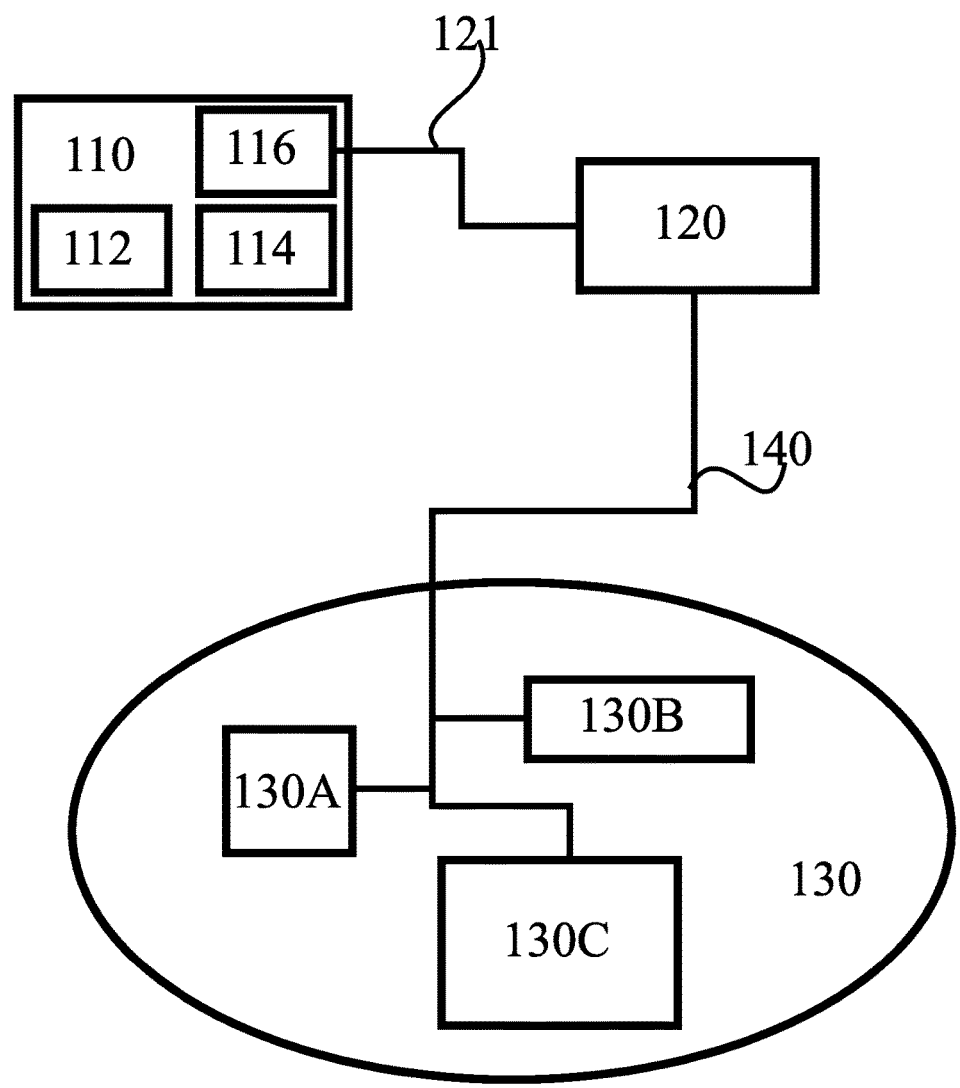
FIG. 1 illustrates an example system capable of illustrating at least some embodiments of the present invention.

FIG. 1 illustrates an example system capable of illustrating at least some embodiments of the present invention. The system of FIG. 1 comprises device 110, which may comprise, for example, a desktop, laptop or tablet computer, a smartphone, phablet computer, cellular telephone, or other kind of electronic apparatus. Device 110 may comprise an embedded device, wherein an embedded device comprises a processor, memory, a computer program in the memory and a user interface configured to enable a user to interact with and direct, at least in part, the operation of the embedded device. The computer program may be, at least in part, persistently stored in the memory in the sense that switching the device off doesn't, at least in whole, erase the computer program from the memory.

Device 110 may comprise a user interface 112 configured to enable a user to direct, at least in part, the operation of device 110. For example, the user interface may comprise a Microsoft Windows, Jolla Sailfish or Google Android-based user interface. Device 110 may comprise a memory 114, which may be configured to store information, such as, for example, information input into device 110 by the user or obtained by device 110 via at least one sensor element comprised in device 110. Examples of sensor elements device 110 may comprise include a satellite positioning receiver, such as for example a global positioning system, GPS, or Galileo receiver, a camera, a fingerprint sensor and an interface with a medical sensor. An example of an interface with a medical sensor comprises a wireless interface with a heart pacer, through which device 110 may obtain information on the user's heart.

Information obtained from sensors comprised in device 110 may be private in nature. For example, a user's fingerprint, heartbeat and location may be classified as private or secret information. Device 110 may be configured to classify information as private based on a source sensor through which the information enters into device 110, and/or the user may classify specific information, or an information type, as private or not private.

Device 110 may further comprise a transceiver 116, which may comprise, for example, an Ethernet, wireless local area network, WLAN, also known as Wi-Fi, cellular or other kind of communication interface enabling device 110 to communicate with further devices. Transceiver 116 may communicate information to and from device 110, for example to and from node 120 via connection 121. Connection 121 may be a wire-line connection, or it may be at least in part wireless. Node 120 may comprise a wireless access point, cellular base station, Ethernet hub or other node. Node 120 may be in communication with network 140, through which communications with device 110 may be routed to and/or from further nodes 130A, 130B and 130C.

Further nodes 130A, 130B and 130C may comprise, for example, devices arranged to access a social media website, or these nodes may comprise computers connected to the Internet. The set of further nodes 130A, 130B and 130C is collectively termed further nodes 130.

Device 110 may share private information with further nodes 130, either on purpose or by accident. Software running in device 110 should be designed and implemented in a way that accidental disclosure of private information does not occur. Further, such software may be designed and implemented in such a way that disclosure of private information may be done in a purposeful way. For example, in case device 110 queries a weather service comprised in one of further nodes 130 for local weather, device 110 may include in the query the name of the city where device 110 is located, rather than an accurate street address or geolocation of device 110. This way, in order to obtain the weather information private information, in this case the location of device 110, is disclosed only to the extent its disclosure is necessary. Thus the purpose is achieved with a minimal disclosure of private information.

In general, a purposeful disclosure of private information comprises that private information is at least one, and in some embodiments all, of the following: disclosed only at a level of accuracy necessary to obtain the purpose, disclosed only at a frequency necessary to obtain the purpose, disclosed only in encrypted form, disclosed only to a minimum number of recipients to obtain the purpose and disclosed only in anonymized form. Anonymized form may comprise that personal identifiers of the user of device 110, or at least one or some of them, are removed from the data prior to disclosure of the private data.

Figure 2:
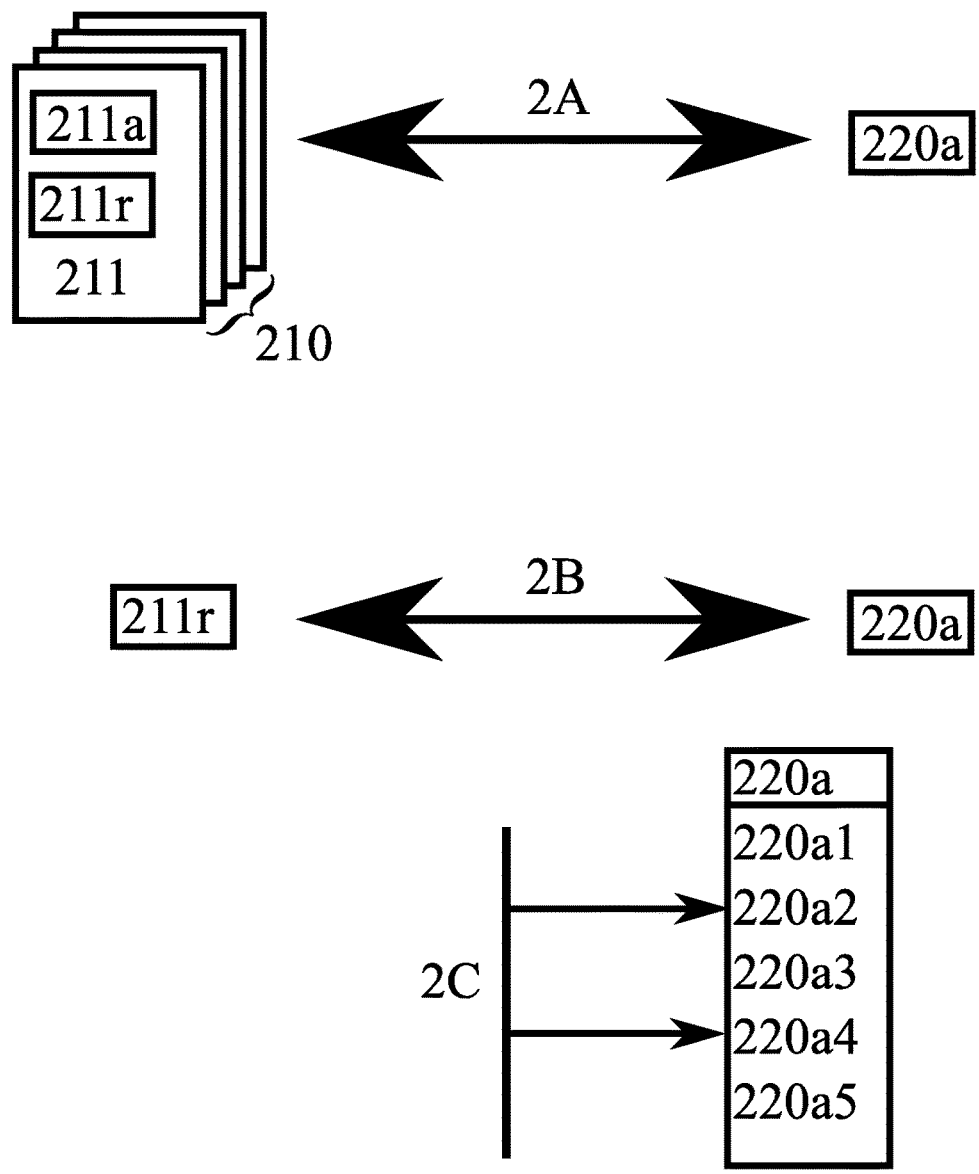
FIG. 2 illustrates an example use case in accordance with at least some embodiments of the present invention.

FIG. 2 illustrates an example use case in accordance with at least some embodiments of the present invention. In this use case, privacy-related programming flaws are avoided using a predictive method. Database 210 comprises, for a programmer, programming team, software development corporation or for a privacy-relevant software development field in general, a library of existing program information. The library need not comprise information concerning all pre-existing software programs implemented by the programmer, team, corporation or field. In library 210 are comprised program entries, such as for example program entry 211. Program entry 211 comprises a source code segment 211*r* and a corresponding privacy feature requirement set 211*a*. Source code segment 211*r* is an implementation produced based, at least in part, on privacy feature requirement set 211*a*. Source code segment 211*r* may comprise an entire program, or alternatively a part of the entire program that is relevant to privacy.

Current privacy feature requirement set 220*a* comprises privacy-related requirements concerning a computer program that is to be developed. Initially a selection phase 2A may be performed by comparing current privacy feature requirement set 220*a* to privacy feature requirement sets comprised in program entries in library 210. In the selection, the privacy feature requirement set in library 210 that most closely resembles current privacy feature requirement set 220*a* is selected, such selection also implying selection of the source code segment that corresponds to the selected privacy feature requirement set. The source code segment that corresponds to the selected privacy feature requirement set is the source code segment that is comprised in the same program entry as the selected privacy feature requirement set.

The selection may be based, for example, on comparing corresponding elements in current privacy feature requirement set 220*a* to each of the privacy feature requirement sets comprised in the entries in library 210. For example, a privacy feature requirement set may be expressed as a vector comprising vector components corresponding to at least some of the following: accessed sensors, frequency of sensor access, encryption strength, retention period, sharing contact number and anonymization. The components may be referred to as privacy feature requirement components, for example.

To determine closeness of two privacy feature requirement sets, initially the requirement sets may be assessed as to the requirement components they have in common. Then the common requirements may be compared to each other, for example by taking for each pair of common requirements an absolute value of their difference, and finally summing or otherwise aggregating the absolute values. Recognizing that privacy requirements that are not the same, but semantically close, direct summing or subtracting may be unfeasible but the requirements may nonetheless be rendered comparable to each other using a suitable combination or aggregation method. Some requirement types may be weighted based on preference. Requirement sets with fewer than a threshold number of common requirement components with the current privacy feature requirement set 220*a* may be ignored. The selection of phase 2A may proceed based on different principles as well, as is clear to the skilled person there exist a large number of ways in which a closest privacy feature requirement set can be selected from library 210.

Alternatively to involving the same privacy features, privacy features that are semantically close may be compared to each other. For example, a social media-based sharing feature in a privacy requirement feature set in library 210 may be compared to an email-based sharing feature in current privacy feature requirement set 220*a*. They may be comparable, for example, since both may involve a number of recipients, the numbers being comparable to each other to determine how close the requirement sets are as it relates to sharing privacy. In the example of FIG. 2, we can assume that in the selection, privacy feature requirement set 211 is selected, which implies a selection of source code segment 211*r* as well, as described above.

Source code segment 211*r* may then be taken as a predicted form of the program that is to be developed. It may be predicted that source code similar to source code segment 211*r* may be developed by the programmer, team, corporation or other entity as a response to current privacy feature requirement set 220*a*.

In phase 2B of the example method of FIG. 2, source code segment 211*r* is compared to current privacy feature requirement set 220*a* to determine, whether deviations from the requirements comprised current privacy feature requirement set 220*a* exist, assuming for the moment that source code segment 211*r* would be an implementation of current privacy feature requirement set 220*a*. If at least one deviation exists, the at least one deviation may form a privacy feature deviation set. In some embodiments, a privacy feature deviation set may be a set of zeros in case no deviations exist, or more generally, any non-deviating privacy requirement types may be represented by a zero or other null value in a privacy feature deviation set. In this case, a privacy feature deviation set would be a vector of equal length to the current privacy feature requirement set 220*a*, the privacy feature deviation set comprising zero and/or non-zero components in dependence of whether deviations exist.

In general, a privacy feature usage set may be derived for source code segment 211*r*, the privacy feature usage set comprising as components information elements that describe how privacy features are used in the source code segment. For example, where current privacy feature requirement set 220*a* comprises a requirement relating to encryption key length, the privacy feature usage set derived from source code segment 211*r* may comprise an element that contains the figure "256", denoting that 256-bit keys are used in source code segment 211r. In general, a privacy feature usage set may comprise as components one information element corresponding to each component in the current privacy feature requirement set 220a, to enable a like-for-like comparison of the two. Where a privacy feature usage set is derived, it may be used when preparing a privacy feature deviation set, or more generally in assessing whether source code segment 211r deviated from current privacy feature requirement set 220a.

The process of phase 2B may comprise, for example, extracting a list of sensor types that source code segment 211r, when compiled and run, will access. Likewise, it can be determined whether data obtained from the sensors is stored in plaintext or encrypted form. The safety of the form of encryption may be characterized, for example by algorithm and/or a length of key that is used. A longer key is associated with safer encryption. Likewise, for certain algorithms a number of rounds, key distribution and/or random number generator type used may be characterized. Anonymization may be identified in source code segment 211r by detecting instances of user-identifying information that is blanked or otherwise modified. In some embodiments, it is estimated how many items there are, or will be, among which the anonymized information cannot be distinguished, to assess the effectiveness of anonymization. This may be seen as analogous to entropy, where a number of microstates producing the same macroscopic properties is estimated.

The effect on privacy of sharing information can be quantified by estimating, how many entities will have access to the information after it is shared by a program compiled based on source code segment 211r. A higher number of entities implies a more severe effect on privacy. Other kinds of privacy requirements, and corresponding characteristics of source code segment 211r, may be implemented in various embodiments of the present invention.

In phase 2C, privacy requirements comprised in current privacy feature requirement set 220a may be flagged responsive to a determination that corresponding security characteristics in source code segment 211r would not properly fulfil these requirements, in other words, that deviations from components comprised in current privacy feature requirement set 220a exist. In the example illustrated in FIG. 2, privacy requirements 220a2 and 220a4 are flagged as not properly fulfilled in source code segment 211r. These features can be given increased attention when implementing the program under development based on current privacy feature requirement set 220a. Alternatively to involving an exactly corresponding privacy feature, flagged privacy requirements may involve privacy features that are semantically close to privacy features analysed in source code segment 211r.

Flagging privacy requirements may be based on a threshold, wherein the threshold may be expressed as a percentage value of a numerical requirement, or, alternatively or additionally, the threshold for each privacy requirement type may be predetermined. In some embodiments, flagging may be done for each privacy requirement in current privacy feature requirement set 220a that is not fulfilled by the implementation assumed implementation of source code segment 211r. The set of flags in current privacy feature requirement set 220a may be considered a privacy feature deviation set, since the flags relate to deviations identified between current privacy feature requirement set 220a and source code segment 211r. In general, a privacy feature deviation set may comprise at least one indication of deviation.

Alternatively or additionally to flagging privacy requirements in current privacy feature requirement set 220a, a section of source code in the program under development may be flagged for separate view, the flagged section implementing a privacy-relevant feature where a deviation was determined. The set of flags in the source code in the program under development may be considered a privacy feature deviation set, since the flags relate to deviations identified between current privacy feature requirement set 220a and source code segment 211r.

For example, a programmer may be tasked to develop a weather forecast application. His development environment, IDE, may access code previously developed by the programmer. With regard to the privacy feature "sensor access frequency", the IDE may first apply 'semantic closeness' to identify that a previously coded fitness tracker application most closely matches the current, weather forecasting, application in terms of its privacy features. The programmer had used application programming interface, API, to access the accelerometer readings at the highest available frequency—while polling at a much lower frequency would have sufficed to achieve the fitness application's functionality. The IDE uses the identified privacy feature to predict that the programmer will likely develop code accessing the user's location at maximum precision, for example, geolocation co-ordinates—even when a much lower precision, such as, for example, 'city level', would suffice for the weather forecasting application. The IDE accordingly advises the developer of the right location data precision level for the weather forecasting application, or marks the code implementing location sharing for follow-up with his supervisor.

Alternatively to selecting a single source code segment 211r, a plurality of source code segments may be selected from library 210. For example, it may be preferable to have something to compare to each of, or most of, the requirements in current privacy feature requirement set 220a.

Figure 3:
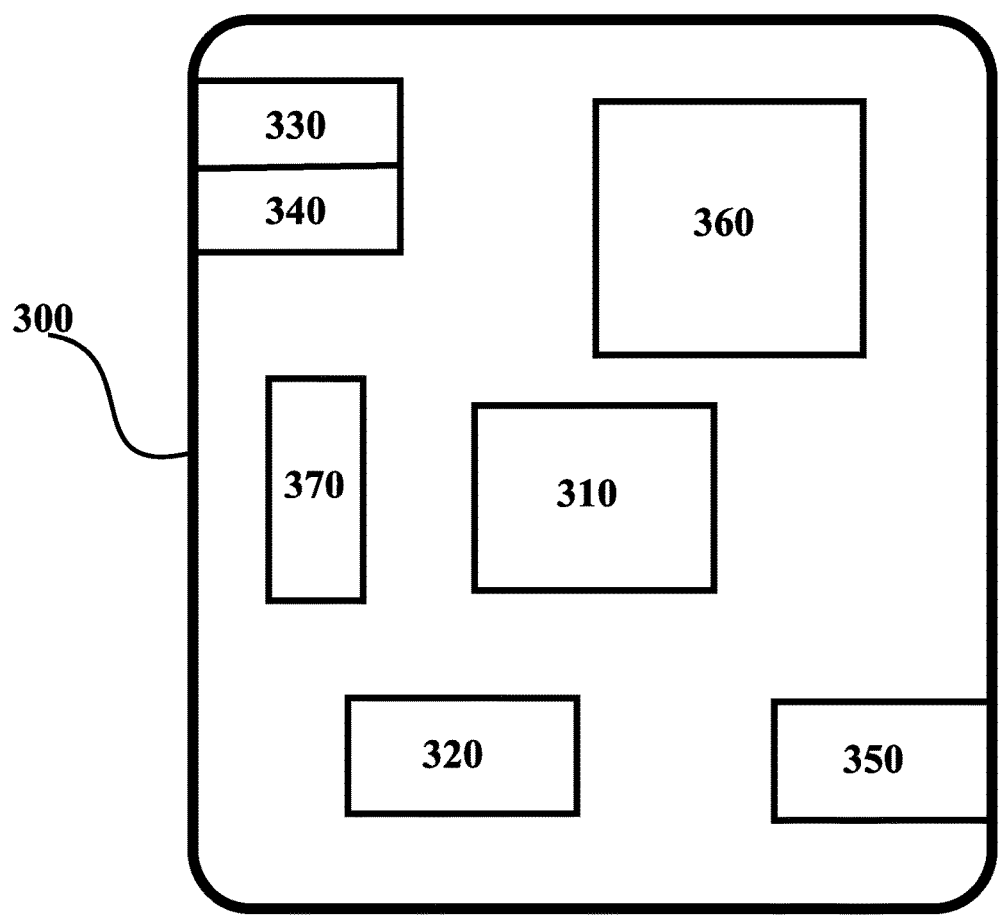
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Bulldozer processing core produced by Advanced Micro Devices Corporation. Processor 310 may comprise at least one Qualcomm Snapdragon, Intel Xeon, Intel Core, AMD Opteron and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. A memory interface may be comprised in memory 320 to allow access to the memory, or, alternatively or additionally, processor 310 or a processing core therein may comprise a memory interface configured to allow access to information stored in memory 320.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to create computer programs and/or analyse existing programs.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
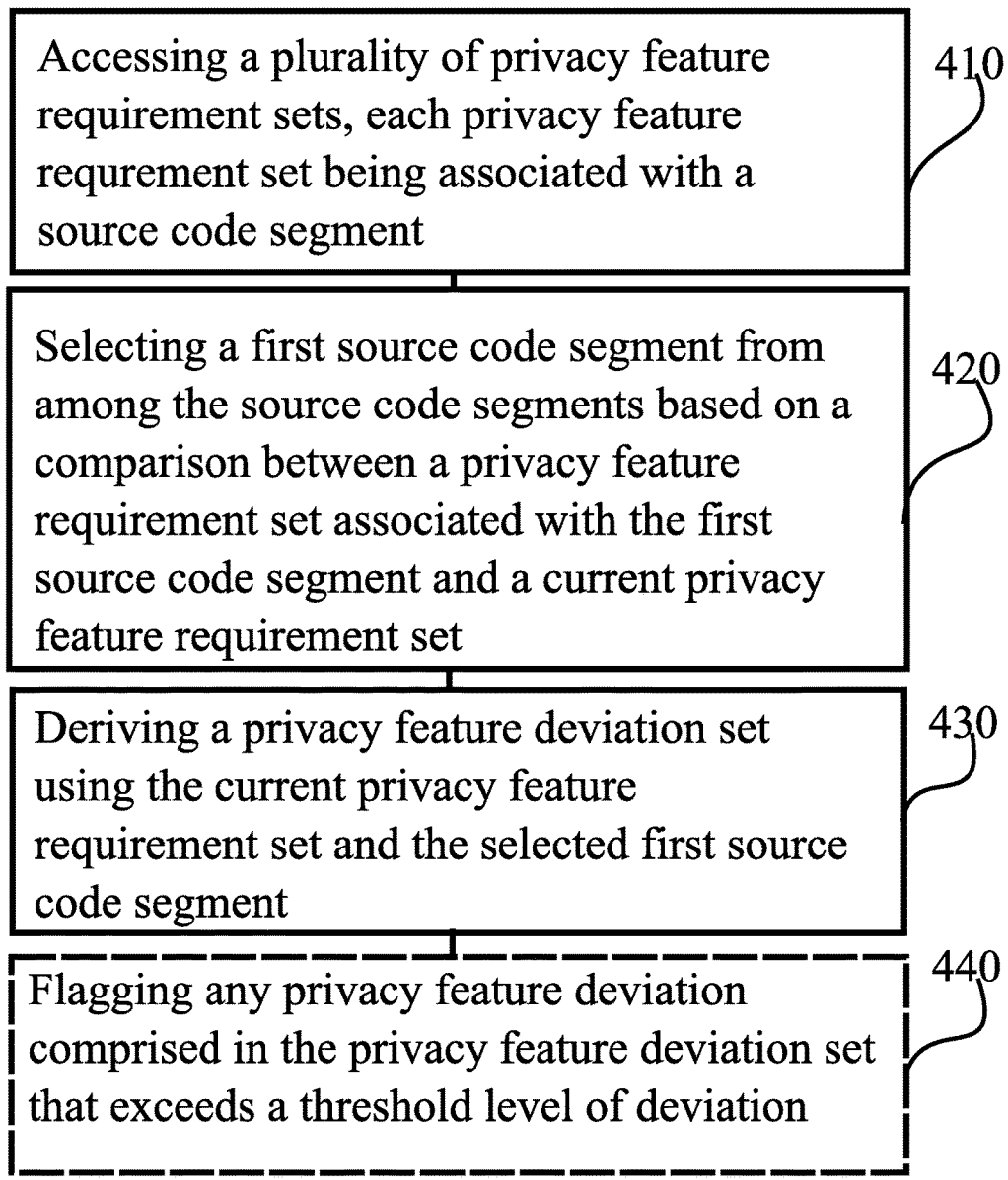
FIG. 4 is a first flow chart of a first method in accordance with at least some embodiments of the present invention.

FIG. 4 is a first flow chart of a first method in accordance with at least some embodiments of the present invention. The phases of the method illustrated in FIG. 4 may be performed in device 110 of FIG. 1 or device 300 or FIG. 3, for example.

Phase 410 comprises accessing a plurality of privacy feature requirement sets, each privacy feature requirement set being associated with a source code segment. Phase 420 comprises selecting a first source code segment from among the source code segments based on a comparison between a privacy feature requirement set associated with the first source code segment and a current privacy feature requirement set. Phase 430 comprises deriving a privacy feature deviation set using the current privacy feature requirement set and the selected first source code segment. Finally, optional phase 440 comprises flagging any privacy feature deviation comprised in the privacy feature deviation set that exceeds a threshold level of deviation.

At least some embodiments may provide the technical effect that a programming tool may pre-select suitable privacy feature programming tools for use. For example, where it is determined that a programmer or corporation would likely produce a computer program failing a privacy requirement relating to an accuracy at which a user's location is revealed to a remote service, a programming environment may enlarge a graphical user interface icon that is used to convert a highly accurate location to a more generic location, such as, for example, a programming function that converts a geolocation to a name of a city in which the geolocation is disposed.

As another example, it may be determined, based on past programming, that computer programs produced in the field of cloud services, by companies active in the area of cloud services, tend to retain consumer banking details for longer than necessary. As a response, a programming environment may flag a time period when unused data is cleared, either when programming or for program review. Thus consumer data retention may be prevented from exceeding a minimum requirement time, decreasing the risk that in case of hacking an unnecessarily large number of consumers would have to replace their banking data with new banking data.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   a memory interface configured to access a plurality of privacy feature requirement sets, each privacy feature requirement set being associated with a source code segment, and
   at least one processing core configured to select a first source code segment from among the source code segments based on a comparison between a privacy feature requirement set associated with the first source code segment and a current privacy feature requirement set, and to derive a privacy feature deviation set using the current privacy feature requirement set and the selected first source code segment, wherein the at least one processing core is configured to select the first source code segment by minimizing a sum of differences of corresponding privacy feature requirement components comprised in the privacy feature requirement sets,
   wherein the at least one processing core is configured to associate privacy feature requirement components comprised in the privacy feature requirement component sets corresponding to the source code segments comprised in the source code segments with semantically close privacy feature requirement components before minimizing the sum of differences.

2. The apparatus according to claim 1, wherein the at least one processing core is further configured to flag any privacy feature deviation comprised in the privacy feature deviation set that exceeds a threshold level of deviation.

3. The apparatus according to claim 1, wherein the at least one processing core is configured to derive the privacy feature deviation set by determining a difference between the current privacy feature requirement set and a privacy feature usage set of the first source code segment.

4. The apparatus according to claim 3, wherein the memory interface is configured to access the privacy feature usage set of the first source code segment from a memory.

5. The apparatus according to claim 3, wherein the at least one processing core is configured to determine, for each of the of source code segments, a corresponding privacy feature usage set.

6. The apparatus according to claim 1, wherein the at least one processing core is configured to select more than one source code segment based on the comparison.

7. The apparatus according to claim 1, wherein each privacy feature requirement set comprises at least one requirement relating to at least one privacy feature.

8. The apparatus according to claim 7, wherein the at least one privacy feature comprises at least one of the following: a list of accessed sensors, a frequency of sensor access, an encryption strength parameter, a data retention period, a data anonymization parameter and a parameter reflective of data sharing.

9. The apparatus according to claim 1, wherein the at least one processing core is configured to predict that a program similar to the first source code segment will be developed based on the current privacy feature requirement set.

10. A method comprising:
    accessing a plurality of privacy feature requirement sets, each privacy feature requirement set being associated with a source code segment;
    selecting a first source code segment from among the source code segments based on a comparison between a privacy feature requirement set associated with the first source code segment and a current privacy feature requirement set;
    deriving a privacy feature deviation set using the current privacy feature requirement set and the selected first source code segment, wherein the first source code segment is selected by minimizing a sum of differences of corresponding privacy feature requirement components comprised in the privacy feature requirement sets, and
    associating privacy feature requirement components comprised in the privacy feature requirement component sets corresponding to the source code segments comprised in the source code segments with semantically close privacy feature requirement components before minimizing the sum of differences.

11. The method according to claim 10, further comprising flagging any privacy feature deviation comprised in the privacy feature deviation set that exceeds a threshold level of deviation.

12. The method according to claim 10, wherein deriving the privacy feature deviation set comprises determining a difference between the current privacy feature requirement set and a privacy feature usage set of the first source code segment.

13. The method according to claim 12, further comprising accessing the privacy feature usage set of the first source code segment from a memory.

14. The method according to claim 12, further comprising determining, for each of the source code segments, a corresponding privacy feature usage set.

15. The method according to claim 10, comprising selecting more than one source code segment based on the comparison.

16. A non-transitory computer readable medium having stored thereon a set of computer readable instructions that, when executed by at least one processor, cause an apparatus to at least:
- access a plurality of privacy feature requirement sets, each privacy feature requirement set being associated with a source code segments;
- select a first source code segment from among the source code segments based on a comparison between a privacy feature requirement set associated with the first source code segment and a current privacy feature requirement set;
- derive a privacy feature deviation set using the current privacy feature requirement set and the selected first source code segment, wherein the first source code segment is selected by minimizing a sum of differences of corresponding privacy feature requirement components comprised in the privacy feature requirement sets, and
- associate privacy feature requirement components comprised in the privacy feature requirement component sets corresponding to the source code segments comprised in the source code segments with semantically close privacy feature requirement components before minimizing the sum of differences.

\* \* \* \* \*